United States Patent [19]

Menzel

[11] 4,087,154

[45] May 2, 1978

[54] GLASS SLIDES WITH MATTED AREAS

[75] Inventor: Gerhard Menzel, Brunswick, Germany

[73] Assignee: Propper Manufacturing Co., Inc., Long Island City, N.Y.

[21] Appl. No.: 520,398

[22] Filed: Nov. 1, 1974

Related U.S. Application Data

[63] Continuation of Ser. No. 267,329, Jun. 29, 1972, abandoned.

[51] Int. Cl.² .............................................. G02B 21/34
[52] U.S. Cl. ..................................................... 350/92
[58] Field of Search ..................................... 350/92–95

[56] References Cited

U.S. PATENT DOCUMENTS

| | | | |
|---|---|---|---|
| 431,132 | 7/1890 | Wharton | 350/92 X |
| 1,693,961 | 12/1928 | Risch | 350/94 |
| 1,983,626 | 12/1934 | Lytle | 161/3.5 X |
| 1,996,141 | 4/1935 | Broadhurst et al. | 350/94 |
| 2,041,290 | 5/1936 | Jackson | 350/95 X |
| 2,801,568 | 8/1957 | Dakin | 350/92 |
| 3,481,659 | 12/1969 | Rosenberg | 350/94 |
| 3,636,663 | 1/1972 | Menzel | 350/92 X |

*Primary Examiner*—Jon W. Henry
*Attorney, Agent, or Firm*—Blum, Moscovitz, Friedman & Kaplan

[57] ABSTRACT

A glass slide which has a matted area. This matted area is formed by a ground surface area of the slide, and this matted area as well as the remainder of the slide are perfectly free of any particles of glass. The matted area extends between an end edge of the slide and an edge which is perfectly parallel with the end edge.

7 Claims, 4 Drawing Figures

GLASS SLIDES WITH MATTED AREAS

This is a continuation, of application Ser. No. 267,329, filed June 29, 1972 now abandoned.

BACKGROUND OF THE INVENTION

The present invention relates to glass slides.

As is well known, glass slides are used to receive specimens which may be examined under a microscope. Such slides have areas adjacent and coplanar with the specimen support areas which are matted so as to receive writing for identifying the slides.

These matted areas of the slides can be achieved either by acid etching, by sandblasting, or by grinding. Acid etching has the disadvantage of limiting the action only to the surface of the slide, so that as a result of such etching the slide is not rendered sufficiently opaque at the matted area to assure easy legibility of writing at the matted area. Sandblasting results in pits which are relatively deep, so that the matted area has an undesirable coarseness which prevents the writing from being legible because, for example, ink will be readily absorbed into the relatively deep pits.

A ground matted area is preferable because it is possible through grinding to achieve the desired opacity which will render writing easily legible while at the same time avoiding the degree of coarseness inherent in sandblasting, so that perfectly legible writing can be easily achieved through a matted ground area on a glass slide.

It is already known to provide glass slides with matted areas by way of grinding procedures, as shown, for example, in U.S. Pat. No. 3,636,663.

However, experience has shown that certain drawbacks are encountered in the use of slides which have matted ground areas. During the grinding operations small particles of glass which are cut from the slide by the grinding elements cling to the glass so that tiny particles of glass become undesirably attached to the slide so as to interfere not only with the writing on the matted area but also with the deposition of specimens and the examination thereof. Furthermore, during the grinding operations it is difficult to maintain the glass slides properly oriented with respect to the grinding elements, so that the ground areas are not always of the desired uniform width.

SUMMARY OF THE INVENTION

It is accordingly a primary object of the present invention to provide a glass slide which will avoid the above drawbacks.

In particular, it is an object of the invention to provide a glass slide which while having all of the advantages of ground glass with respect to the matted area will also have the advantage of being completely free of any glass particles.

Furthermore, it is an object of the invention to provide a glass slide where the matted area is of a perfectly uniform width.

Also, it is an object of the invention to provide a glass slide which has a matted area either on one surface or on both surfaces.

In addition it is an object of the invention to provide a glass slide which has at its matted area a surface texture resulting from straight unidirectional lines extending across the slide, so as to enhance the legibility of writing deposited on the matted area.

According to the invention the glass slide has a matted ground area and is perfectly free of glass particles both at the latter area and at the remainder of the slide.

BRIEF DESCRIPTION OF THE DRAWINGS

The invention is illustrated by way of example in the accompanying drawings, which form part of this application and in which.

DESCRIPTION OF THE PREFERRED EMBODIMENTS

Figure 1:
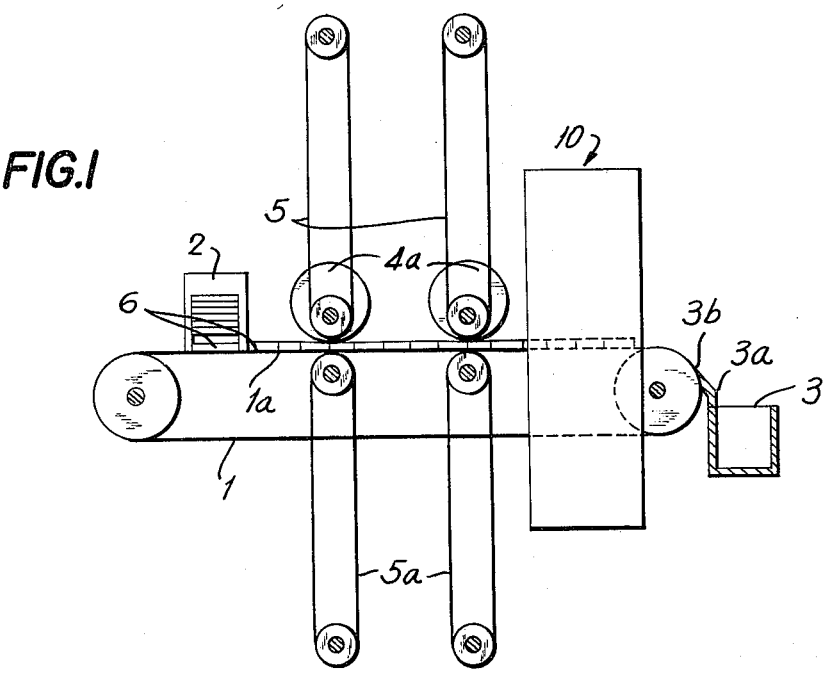
FIG. 1 is a schematic elevation of one apparatus for achieving the glass slide of the invention.

Referring to the drawings, there is shown therein an endless conveyor belt 1 having an upper run provided with a left receiving end and a right discharge end, as viewed in the drawings. Over the left receiving end of the upper run of the conveyor belt 1 is a supply means 2 in the form of a chute or elongated hollow tube having an upper open end through which slides can be introduced into the guide tube or chute 2. This supply means has a configuration corresponding to that of the glass slides, and it is supported by any suitable unillustrated framework in a manner which enables the supply means to be laterally adjusted as indicated by the double-headed arrow shown at the upper left portion of FIG. 2. In this way the extent to which the supply means 2 extends beyond the edge of the belt 1 shown at the lower part thereof in FIG. 2 can be regulated. The distance of the bottom end of the supply means 2 from the upper surface of the upper run of the belt 1 is such that the movement of the upper run of the belt, by frictional engagement with the bottom surface of each slide, results in displacement of the slides one by one out of the bottom end of the tube or chute which forms the supply means 2. Thus, in accordance with the adjustment of this supply means, each glass slide will be transported by the upper run of the belt 1 from the receiving end toward the discharge end thereof, with a predetermined portion of each glass slide extending laterally beyond the side edge of the belt 1, as explained above.

Figure 2:
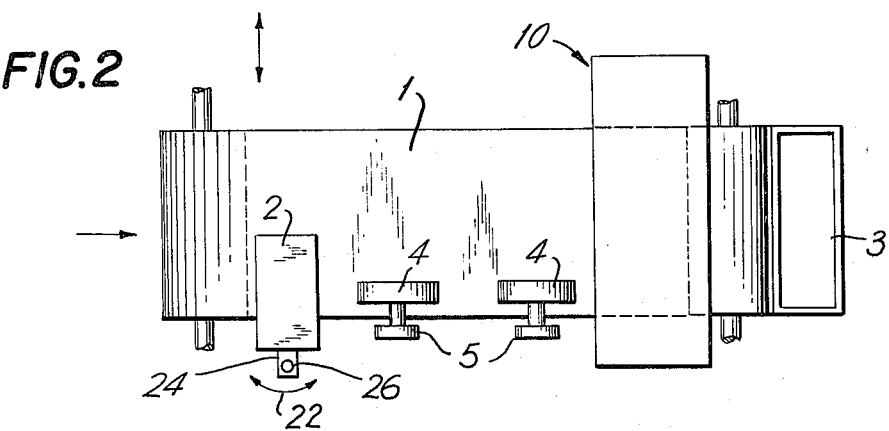
FIG. 2 is a schematic top plan view of the apparatus of FIG. 1.

At the delivery end of the belt 1 is a receiving means 3 in the form of a container having an open top and provided at its left wall, as viewed in FIGS. 1 and 2, with a curved portion 3a which extends around the upper right portion of the belt 1 at the discharge end thereof. This wall 3a terminates in a springy tongue 3b which directly engages the surface of the belt 1 at its discharge end and at its upper run for the purpose of positive removing the slides 6 therefrom as the slides reach the discharge end of the upper run of the belt 1.

In the illustrated example the upper run 1a of the belt 1 moves beneath a pair of driven pressure rollers 4 made of a soft elastic material such as, for example, foam rubber.

High-speed grinding elements 5 are situated beyond the edge of the belt 1 shown at the lower part of FIG. 2. These grinding elements 5 are, in the illustrated example, in the form of endless grinding belts, and they are carried by suitable pulleys and driven through any suitable drive. The soft pressure rollers 4 also may be independently driven, although they can turn simply from frictional engagement with the belt 1 or the slides 6 thereon.

As is illustrated in FIG. 1, it is possible to situate opposite the upper grinding belts 5 a pair of identical grinding belts 5a the upper ends of which are spaced beneath the lower ends of the belts 5 by a distance equal to the thickness of the slides 6. For this purpose the upper and/or lower grinding belts 5, 5a can be adjustable in elevation, and these lower belts 5a can also be driven in any suitable way so as to form the high-speed grinding elements.

The slides 6 delivered from the supply means 2 by movement of the belt 1 with respect thereto reach the pair of pressure rollers 4 so as to be successively pressed thereby against the upper surface of the upper run of the conveyor belt 1. While each slide is pressed against the belt 1 by a pressure roller 4, an exterior surface of each slide is ground by a belt 5 and/or 5a. It is thus possible to grind an upper surface and/or a lower surface of each slide at a selected location over an area determined by the width of the high-speed grinding elements 5, 5a. Thus, the location of the matted portion of each slide will be determined by the extent to which the supply means 2 extends laterally beyond the side edge of the conveyor belt 1.

The slides which are matted on one or both sides reach the removing tongue 3b of the receiving means 3 to be removed thereby and guided along the curved wall 3a into the container which forms the receiving means 3. After the latter has been filled to the desired extent, it can be removed, and for this purpose it may be supported on any suitable rollers or the like so that it can be laterally moved away and replaced by an empty receptacle.

The above-described apparatus is provided with any suitable means 10 for eliminating small particles of glass which might otherwise cling to the slides 6. During the grinding operations small particles of glass separated from the slides and these particles would cling undesirably to the glass slide, either at the ground area thereof or at some other part of the slide, unless suitable steps are taken to achieve perfectly clean slides which are completely free of such glass particles. Such a means for removing glass particles from the slides is schematically represented by the means 10. The block 10 of FIGS. 1 and 2 is intended to represent any structure which will efficiently remove glass particles resulting from the grinding operations. For example, the means 10 may take the form of a suitable housing surrounding the structure, as shown in FIGS. 1 and 2, and through which the slides pass subsequent to the grinding thereof. Within this housing 10 it is possible to situate, for example, suitable blowers which direct jets of air against the slides so as to remove glass particles therefrom. It is emphasized that this is but one example of a possible means for eliminating the glass particles and any other means which will achieve this result may be used. In this way the slides 6 which are illustrated in FIGS. 3 and 4 in particular are perfectly free of glass particles both at the matted area 12 and at the remainder of the slide.

Figure 3:
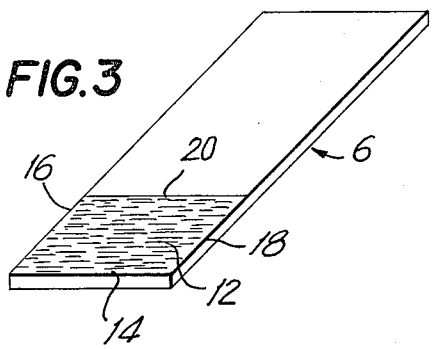
FIG. 3 is a perspective illustration of a slide according to the invention.
Figure 4:
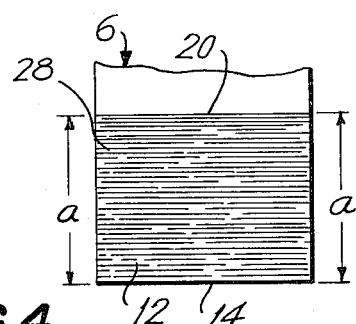
FIG. 4 is a fragmentary top plan view of a slide of the invention illustrating in particular the matted area thereof.

It will be noted from FIGS. 3 and 4 that the matted area 12 of the glass slide extends from an end edge 14 of the slide across the slide between front and rear edges 16 and 18 thereof, this matted area 12 terminating in an edge 20. Experience has shown that if special measures are not resorted to, the slides 6 when moving from the supply means 2 will tend to assume an angular position where they are angularly oriented with respect to the conveyor belt 1 and the grinding elements 5, so that the edge 20 is not parallel to the edge 14. In order to avoid this drawback the supply means 2 is rendered angularly adjustable, as shown by the double-headed curved arrow 22 in FIG. 2. Thus, the supply means 2 may have an extension 24 supported in any suitable way for swinging movement about a vertical pivot 26, and with a suitable adjusting structure it is possible to swing the supply means with respect to the conveyor belt 1 so that the slides 6 will have matted areas of perfectly uniform width. In other words, as shown in FIG. 4, the dimensions a will be perfectly equal to each other and the edge 20 will be perfectly parallel to the edge 14.

It is furthermore to be noted that as a result of the grinding action, the matted area is composed of a textured surface made up of lines 28, all of which extend in the same direction and are parallel to each other. These unidirectional lines 28 are parallel to the edge 20 and the edge 14. This is a further feature of the glass slides of the invention which enables the matted area to have high degree of opacity while at the same time not being rough or coarse enough to detract from the legibility.

What is claimed is:

1. A glass microscope slide having a specimen support area and adjacent coplanar matted ground area suitable to render writings thereon clearly legible which area along with the remainder of the slide is free of any particles of glass, the slide being of a rectangular configuration having on one surface an end edge and parallel front and rear edges extending perpendicularly from said end edge, the matted area extending from said end edge across the slide between said front and rear edges thereof and terminating in an edge which is parallel to said end edge, said matted area being composed of matting lines which are parallel to each other, said lines being parallel to said end edge.

2. The slide of claim 1, wherein said parallel matting lines are substantially oriented parallel striations, the glass surface defining said striations being roughened by belt-grinding.

3. The slide of claim 2 and wherein the slide has an opposed surface opposite from the surface which has said matted area, and said opposed surface having a matted area coextensive with said first-mentioned matted area.

4. The slide of claim 2 and wherein the matted area is sufficiently opaque to render writing thereon easily legible while at the same time lacking the degree of coarseness which would detract from the legibility of the writing.

5. The slide of claim 3 and wherein the matted area on said opposed surface has a construction identical with said first-mentioned matted area.

6. The slide of claim 5 and wherein the matting lines at said matted area of said opposed surface are parallel to the matting lines of said first-mentioned matted area.

7. A glass microscope slide comprising a rectangular piece of glass having top and bottom rectangular surfaces, opposing end edges and opposing lengthwise edges forming the perimeter of said rectangular surfaces and extending therebetween, said end edges being shorter in length than said lateral edges, a specimen support area and adjacent coplanar matted area encompassing a portion of at least one of said top and bottom rectangular surfaces, said matted area being adjacent one of said end edges and extending between said opposing lengthwise edges, said matted area being formed by a plurality of elongated striations ground in said surface, said striations being oriented and lying in the direction transverse to said lengthwise edges, said striations being of substantially uniform depth to provide a substantially opaque appearance so that indicia material deposited by a writing instrument on said matted area is highly visible in contrast to said opaque surface and so that the spread of said written indicia is restricted by said oriented striations to provide greater legibility.

* * * * *